US008527086B2

(12) United States Patent
Elmenhurst

(10) Patent No.: US 8,527,086 B2
(45) Date of Patent: Sep. 3, 2013

(54) RETURN ADDRESS DESTINATION DISCRIMINATION TECHNOLOGY

(75) Inventor: Brian J. Elmenhurst, Redmond, WA (US)

(73) Assignee: RAF Technology, Inc., Redmond, WA (US)

( * ) Notice: Subject to any disclaimer, the term of this patent is extended or adjusted under 35 U.S.C. 154(b) by 485 days.

(21) Appl. No.: 12/821,622

(22) Filed: Jun. 23, 2010

(65) Prior Publication Data

US 2010/0324724 A1 Dec. 23, 2010

Related U.S. Application Data

(60) Provisional application No. 61/219,706, filed on Jun. 23, 2009.

(51) Int. Cl.
*G06F 17/00* (2006.01)

(52) U.S. Cl.
USPC ........... 700/226; 209/584; 700/213; 700/225; 705/337

(58) Field of Classification Search
USPC ........................................................ 700/226
See application file for complete search history.

(56) References Cited

U.S. PATENT DOCUMENTS 4,921,107 A 5/1990 Hofer
5,031,223 A 7/1991 Rosenbaum
5,079,714 A 1/1992 Manduley
5,422,821 A 6/1995 Allen
5,514,863 A 5/1996 Williams
5,518,122 A 5/1996 Tilles
5,703,783 A * 12/1997 Allen et al. .................. 700/213
5,734,568 A 3/1998 Borgendale
5,745,590 A 4/1998 Pollard
5,923,848 A 7/1999 Goodhand
6,246,794 B1 6/2001 Kagehiro
6,292,709 B1 9/2001 Uhl
6,327,373 B1 12/2001 Yura
6,343,327 B2 1/2002 Daniels, Jr.
6,360,001 B1 3/2002 Berger
6,370,259 B1 4/2002 Hobson
6,434,601 B1 8/2002 Rollins
6,470,091 B2 10/2002 Koga
6,539,098 B1 3/2003 Baker (Continued)

FOREIGN PATENT DOCUMENTS

EP 0759596 A2 2/1997
JP 61-234481 A 10/1986

OTHER PUBLICATIONS

United States Postal Service Publication 28 "Postal Addressing Standards" dated Jul. 2008; text plus Appendix A only; 55 pages.

(Continued)

*Primary Examiner* — Timothy Waggoner
*Assistant Examiner* — Kyle Logan
(74) *Attorney, Agent, or Firm* — Stolowitz Ford Cowger LLP

(57) ABSTRACT

Methods, software and apparatus (FIG. 5) disclosed to maintain and update an association database (650) that enables relating updated address information to affected mailpieces (FIG. 7), and providing the benefits of that information to mailers, especially business or corporate mailers (600, 630, 632), and in the case of co-mingled mail, enabling a pre-sort house (610) to provide the updated information to their customers, or to update mailing lists maintained by or for their customers.

15 Claims, 6 Drawing Sheets

(56) References Cited

U.S. PATENT DOCUMENTS

| | | | | |
|---|---|---|---|---|
| 6,549,892 | B1 | 4/2003 | Sansone | |
| 6,697,500 | B2 | 2/2004 | Woolston | |
| 6,741,724 | B1 * | 5/2004 | Bruce et al. | 382/101 |
| 6,768,810 | B2 | 7/2004 | Emanuelsson | |
| 6,816,602 | B2 | 11/2004 | Coffelt | |
| 6,829,369 | B2 | 12/2004 | Poulin | |
| 6,985,926 | B1 | 1/2006 | Ferlauto | |
| 7,121,458 | B2 | 10/2006 | Avant | |
| 7,171,049 | B2 | 1/2007 | Snapp | |
| 7,204,415 | B2 | 4/2007 | Payne | |
| 7,518,080 | B2 | 4/2009 | Amato | |
| 2001/0010334 | A1 | 8/2001 | Park | |
| 2003/0046103 | A1 * | 3/2003 | Amato et al. | 705/1 |
| 2003/0182018 | A1 * | 9/2003 | Snapp | 700/225 |
| 2005/0119786 | A1 | 6/2005 | Kadaba | |
| 2005/0251285 | A1 * | 11/2005 | Boyce et al. | 700/226 |
| 2008/0130947 | A1 | 6/2008 | Ross | |
| 2008/0294474 | A1 | 11/2008 | Furka | |
| 2009/0057207 | A1 * | 3/2009 | Orbke et al. | 209/584 |

OTHER PUBLICATIONS

NCOA Link at http://ribbs.usps.gov/ncoalink/ncoalink_print.htm; dated May 27, 2009; 3 pages.

Online NCOALink Processing Acknowledgement Form (PAF) Released by Lorton Data; http://us.generation-nt.com/online-ncoalink-processing-acknowledgement-form-paf-released-by-press-1567191.html; release dated Jun. 2, 2009; 1 page.

Stolowitz Ford Cowger LLP List of Related Matters dated Dec. 23, 2011.

* cited by examiner

RETURN ADDRESS DESTINATION DISCRIMINATION TECHNOLOGY

RELATED APPLICATIONS

This application claims priority from U.S. Provisional Application No. 61/219,706 filed Jun. 23, 2009, and incorporated herein by this reference.

COPYRIGHT NOTICE

©2009-2010 RAF Technology, Inc. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71 (d).

TECHNICAL FIELD

This present disclosure pertains to methods and apparatus for sorting and handling items, such as mail pieces, and more specifically to improvements in updating mailers' address data to reduce errors, delay, and misdirected mail pieces.

BACKGROUND

Glossary of Acronyms

POSTNET (POSTal Numeric Encoding Technique) barcode is used to encode zip code information on letter mail. It may have five, nine or eleven digits.

IMB (Intelligent Mail Barcode) is a new USPS® barcode technology used to sort and track letters and flats. Intelligent Mail barcode technology, among other things, combines the capabilities of the POSTNET™ barcode and the PLANET Code® barcode into one unique barcode. IMB has a total of 31 digits and allows mailers more digits for their use, allowing unique identification of up to approximately a billion mailpieces per mailing.

NCOA refers to the national change of address database maintained by the U.S. Postal Service. We use "COA" for a change of address database generally.

OVERVIEW

As noted above, the new IMB provides greater flexibility. It must contain a routing ZIP code and a mailer identifier (MID) to satisfy the criteria for automation postage pricing. However, it will be some time before the IMB is phased into widespread use. Even when it comes into use, some mailers will not obtain a unique MID. Rather, they will leave their contractors (pre-sorters) to track their mailpieces. The presorters can track the owner of the mail if they process the mail in a batch mode based on the customer. There are instances, however, where in order for a presorter to get maximum USPS discounts, the presorter has to comingle the mail from multiple mailers. When they do this they lose the association of the mail piece to the owner (the presorter's customer) that batch-based sorting had provided.

Thus, one problem in the prior art (a problem that still exists even after the advent of IMB), is the problem of associating mail pieces to the sender (the owner), as distinguished from the mailer (e.g., a presort house). This problem particularly affects the challenge of maintaining and updating mailing lists, for example to capture updated destination (change of address) data. If at least the affected mail pieces could be associated back to the owner-sender, corresponding mailing lists could be updated in a timely and accurate way.

Methods and apparatus are disclosed herein to maintain and update an "association database" that enables relating updated address information to affected mailpieces, and providing the benefits of that updated information to the corresponding mailers, especially business or corporate mailers, to update their mailing databases. Further, in the case of comingled mail, for example a batch created by a pre-sort house to qualify for discounted postage rates, the present disclosure in another aspect enables a pre-sort house to provide the updated address information to their customers, or to update mailing lists maintained by or for their customers.

In an embodiment, the method calls for reading a return address at substantially the same time as reading a destination address from the same mailpiece. The return address information can be used to notify the sender when the destination address is updated as by a change of address order.

In accordance with one embodiment, a method for online processing of mail pieces comprises the steps of:

receiving a mailpiece into an automated processing machine;

capturing an image of at least a front side of the mailpiece;

storing the captured image in the form of a digital data file;

transmitting the image data file to a recognition software component;

reading addressee name, a destination address and a sender address from the captured image of the mailpiece;

determining a routing code corresponding to the destination address;

querying a move update (COA) database for a matching record based on the destination address and addressee name;

providing an association database for storage of digital database records;

if a matching record is found in the move update (COA) database, obtaining from the matching database record new routing information comprising an updated destination address;

determining a new routing code corresponding to the updated destination address; and if the move update (COA) database returns new routing information, storing the addressee name, original destination address, updated destination address, and sender address data in association with one another in the association database;

Additional aspects and advantages of this invention will be apparent from the following detailed description of preferred embodiments, which proceeds with reference to the accompanying drawings.

DETAILED DESCRIPTION OF EXAMPLE EMBODIMENTS

Figure 1:
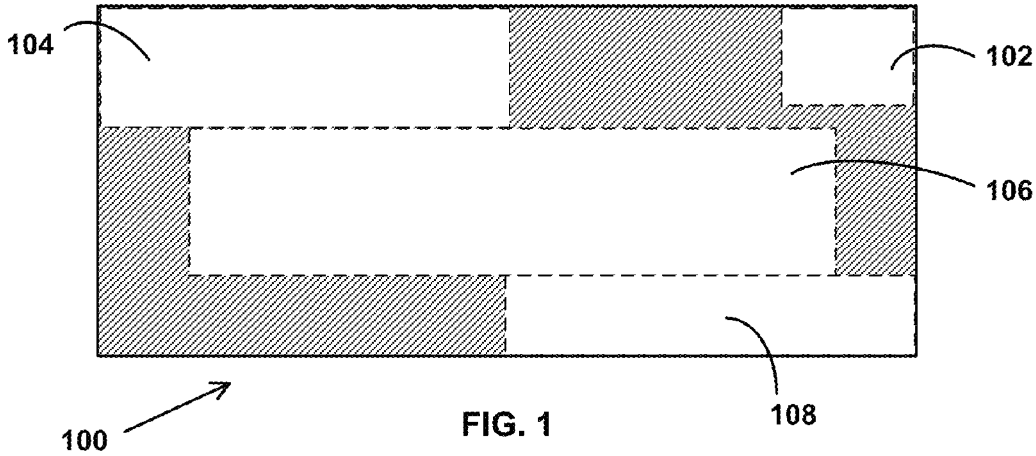
FIG. 1 is a front view of an envelope showing preferred return address and destination address regions.

Several preferred examples of the present application will now be described with reference to the accompanying drawings. Various other examples are also possible and practical. Referring now to the drawings, FIG. 1 is a front (address side) of mailpiece 100 having several areas available for address information. With reference to FIG. 1, mailpiece 100 has postage area 102, optical character recognition (OCR) read area 106, POSTNET clear zone 108, and return address area 104. To illustrate, if address 314 (FIG. 3) is located within OCR read area 106, a multiline optical character reader (MLOCR) may be able to resolve address 314 and print a Postal Numeric Encoding Technique (POSTNET) barcode, such as POSTNET barcode 300 (FIG. 3), in POSTNET clear zone 108. The barcode may be printed directly onto the envelope, or onto a sticker or label affixed to the envelope in the clear zone, as further discussed later. The U.S. Postal Service defines a complete address as one that has all the address elements necessary to allow an exact match with the current Postal Service ZIP+4 and City State files to obtain the finest level of ZIP+4 and delivery point codes for the delivery address. A complete address may be required on mail at some automation rates.

FIG. 1, however, is a simplified or idealized representation of the various areas on the front of a mailpiece. In practice, mailers often violate these guidelines, and place information, including parts of return address and destination address information, in various other locations that make machine "reading" of the destination more difficult. In fact, sometimes a return address is mistakenly read as the destination address. (In such cases, the mail piece may indeed be routed back to the mailer, much to her surprise and disappointment.) In other situations, a mechanical screen may be used for a particular batch of mail to exclude a selected portion of the piece from the imaging apparatus, for example, where non-address information (e.g., advertisement, logo, etc.) appears on the mail piece in an area where it could be confused with destination address data.

Figure 2:
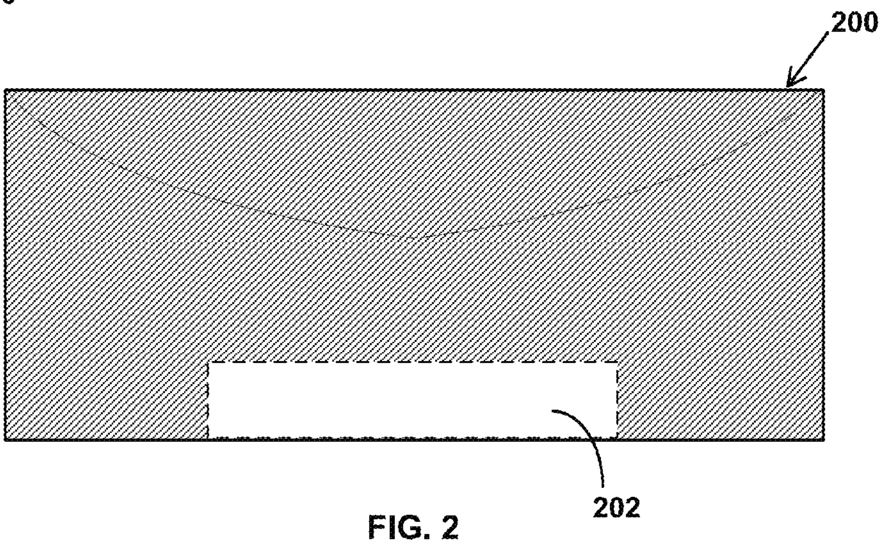
FIG. 2 is a rear view of an envelope showing a ID Tag clear zone.

With reference to FIG. 2, ID Tag clear zone 202 is on the rear side (back side) of mailpiece 200. A unique ID Tag (not shown) may be applied to the back of mailpiece 200 (in ID Tag clear zone 202) to allow data to be matched with mailpiece 200 in subsequent automated operations. For example, if address 314 cannot be read by an OCR, an image may be captured and sent to a Remote Encoding Center (REC). A keyer (manual input person) at the REC can input address elements, such that the data base can look-up the correct zip code for that address and match that to the mail piece. The ID Tag allows the data to be matched with the specific mailpiece and POSTNET barcode 300 to be applied downstream (e.g. by an Output Sub-System).

Figure 3:
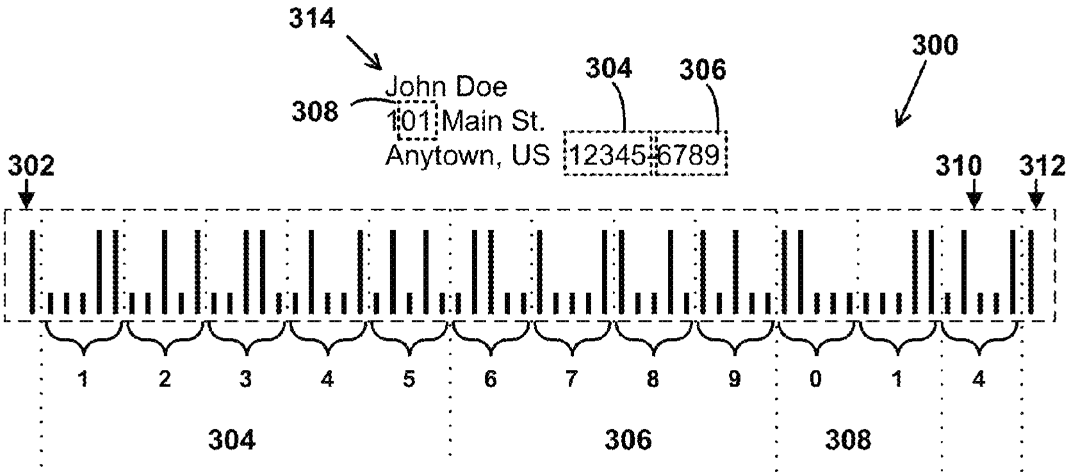
FIG. 3 is a POSTNET barcode illustrating an eleven-digit delivery point barcode.

Referring now to FIG. 3, POSTNET barcode 300 corresponds to address 314. Frame bars 302 and 312 begin and end the barcode sequence. POSTNET barcode 300 is currently an eleven-digit delivery point code representing zip code in field 304, plus-four code in field 306, delivery point code at field 308, and finally a check digit 310. Delivery point code 308 may be a specific set of digits between 00 and 99 such as the last two digits of a street address. The delivery point code 308, zip code 304, and plus-four code 306 result in a unique, numeric identifier for nearly every address served by the United States Postal Service (USPS). Check digit 310 essentially is a form of redundancy check used for error detection. Other POSTNET barcodes may also be applied to POSTNET clear zone 108, such as a nine-digit barcode representing zip code 304 and plus-four code 306, a five-digit barcode representing zip code 304, or a 4-state barcode where the bars represent four states (e.g., four lengths) instead of just two states (e.g., two lengths).

Figure 4:
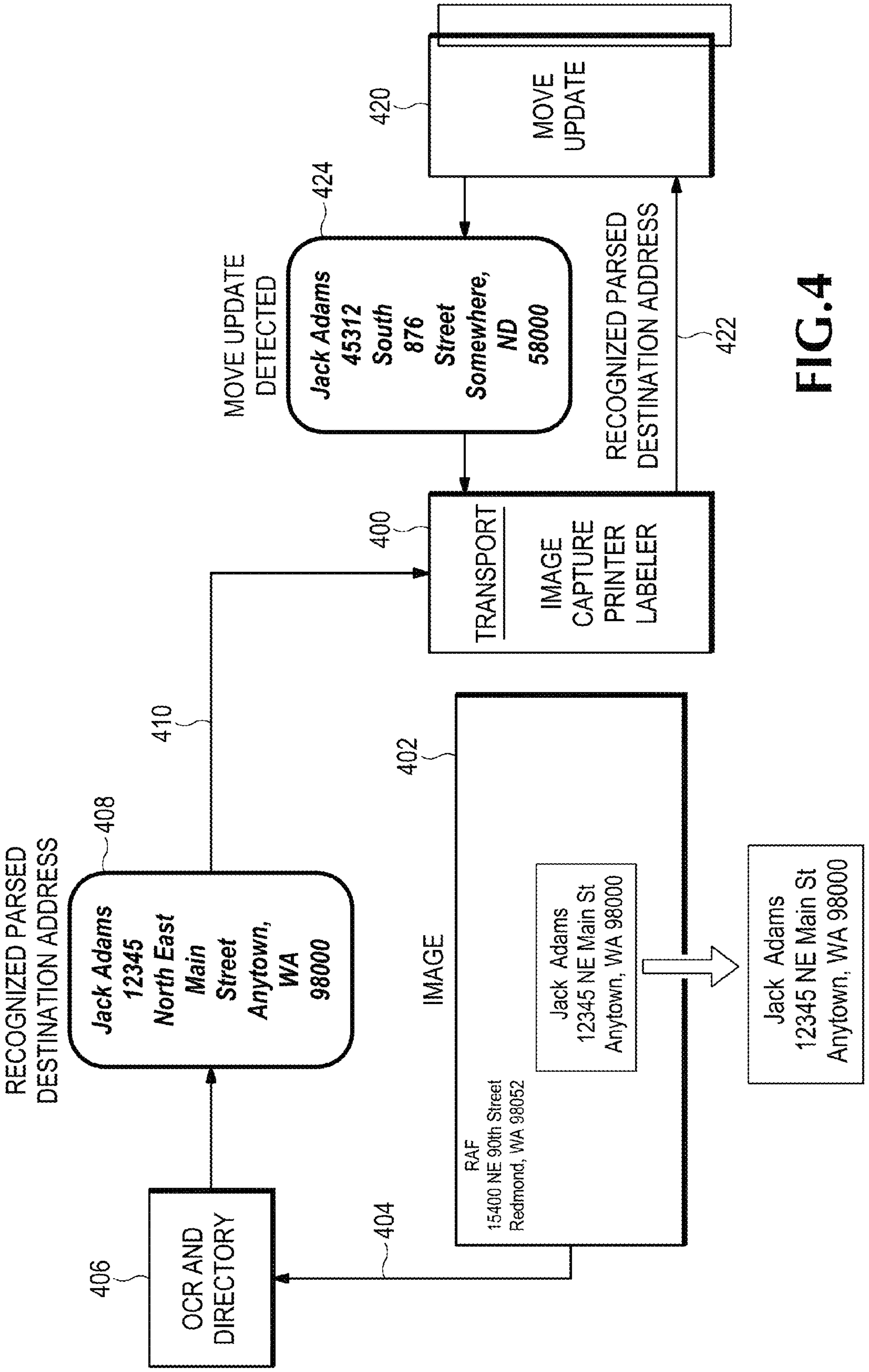
FIG. 4 is a simplified flow diagram illustrating a process for reading and updating a destination address of a mailpiece.

Referring now to FIG. 4, a simplified flow diagram illustrates an example of a known process for processing a mailpiece. In some systems, a sorter machine (not shown) is computer controlled, and executes a transport software component 400 for processing mail pieces, which enter the process one at a time, and advance, for example, via a belt-driven track. The transport component 400 includes, or is coupled to, an image capture component (e.g. a digital camera, software, etc., not shown) for capturing an image of all or portions of a mailpiece.

The captured image 402 (typically, a digital data file that encodes the image) is transmitted, path 404, to a recognition software component or system 406, which may comprise OCR and address directory facilities. In general, the recognition software 406 extracts or "recognizes" text from the mailpiece image, using OCR and other techniques. Since there are typically two valid addresses on a mail piece (the return and destination addresses), there are various methods employed to reduce the potential of locking onto and reading the return address. This can be as extreme as hardcoded exclusion areas, a sophisticated point system based on the position of the address paragraph or some combination of methods. Regardless of how the distinction is made, only one address, namely the destination address, is read in the prior art.

The extracted address text may be produced in ASCII or another standard encoding, and the recognition system uses that address block data to query a directory of valid addresses. Assuming a match is found, the address directory returns the selected destination address in a standardized or "canonical" form. In that form, every element of the address is defined unambiguously. For example, in FIG. 4, note that the actual destination address in the image 402 reads in part, "12345 NE Main St." After recognition and parsing, the canonical form shows the following values, where the field names are implied by sequence or other protocol:

[house number: 12345], [prefix: North East], [name: Main], [suffix: Street]. See box 408. Name data is parsed but segregated from address data. Address directory 406 may or may not contain name information, whereas names must be distinguished in the COA database. For example, a young person may move, while the rest of the family remains at the "old address."

Next, based on the destination address, the system will return an "assignment" or routing code, shown via path 410, back to the transport software 400. The routing code may comprise, for example, an 11-digit code including ZIP+4+2. The recognition component also returns the destination address to the transport component 400 in association with the subject mailpiece. The transport software uses the destination address to query a "move update" or change of address (COA) database 420. See path 422. The COA database 420 returns updated routing data (a new destination address), as well as a corresponding routing code, if a match is found (box 424). The transport system 400 then prints or sprays the updated destination address onto the mail piece (corresponding to image 402). Typically, change of address orders submitted by USPS customers, for example when a person moves to a new home, are maintained in the national change of address (NCOA) database for one year.

The transport component 400 then causes a routing code to be sprayed, printed or otherwise affixed to the front of the mailpiece, for example in the POSTNET reserved region of FIG. 1, either using the first routing code assigned by the recognition system, or using an updated routing code if one is provided by the COA database 420.

Figure 5:
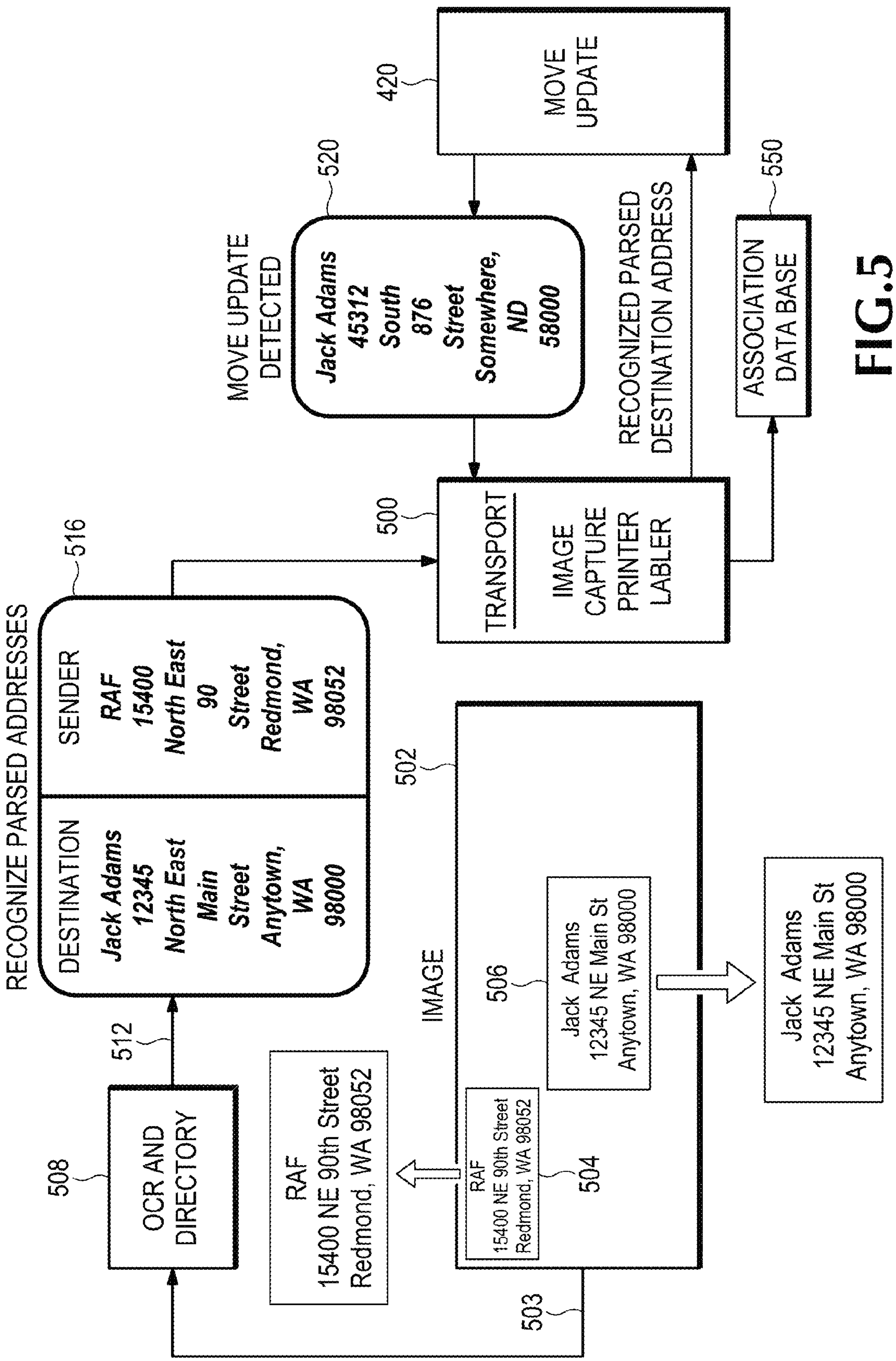
FIG. 5 is a simplified flow diagram illustrating a process for updating an associational database.

Referring now to FIG. 5, an illustrative example of a new process is illustrated as follows. Preliminarily, it should be noted that software components, routines, programs, etc. can be variously structured and arranged. For example, in the illustrated system, the transport software may include an image capture component in some embodiments. In another embodiment, image capture might be configured as a separate component that communicates with the transport component. In another example, an address directory might be considered part of a recognition component. On the other hand, the address directory may be considered a separate database service that receives a query from the recognition component and returns a result. There are many possible variations in how the components of a system may be arranged and operations allocated among them. Some of those variations reflect design choices, while others may evolve within the confines of legacy systems. The specific allocation of the various functions described herein to particular hardware or software components is not critical. The processing flows described herein are merely illustrative, and they too may well vary from the examples in view of a different functional allocation of resources and responsibilities.

In the illustrated system of FIG. 5, a transport software component 500 implements or manages an image capture function for a mailpiece reflected in image 502. The captured image is transmitted, via path 503, to a recognition component 508. The image capture process is configured to include within a captured image at least selected regions of the mailpiece where return address as well as destination addresses may be found. See regions 104 and 106 in FIG. 1, respectively, as one example.

Figure 8:
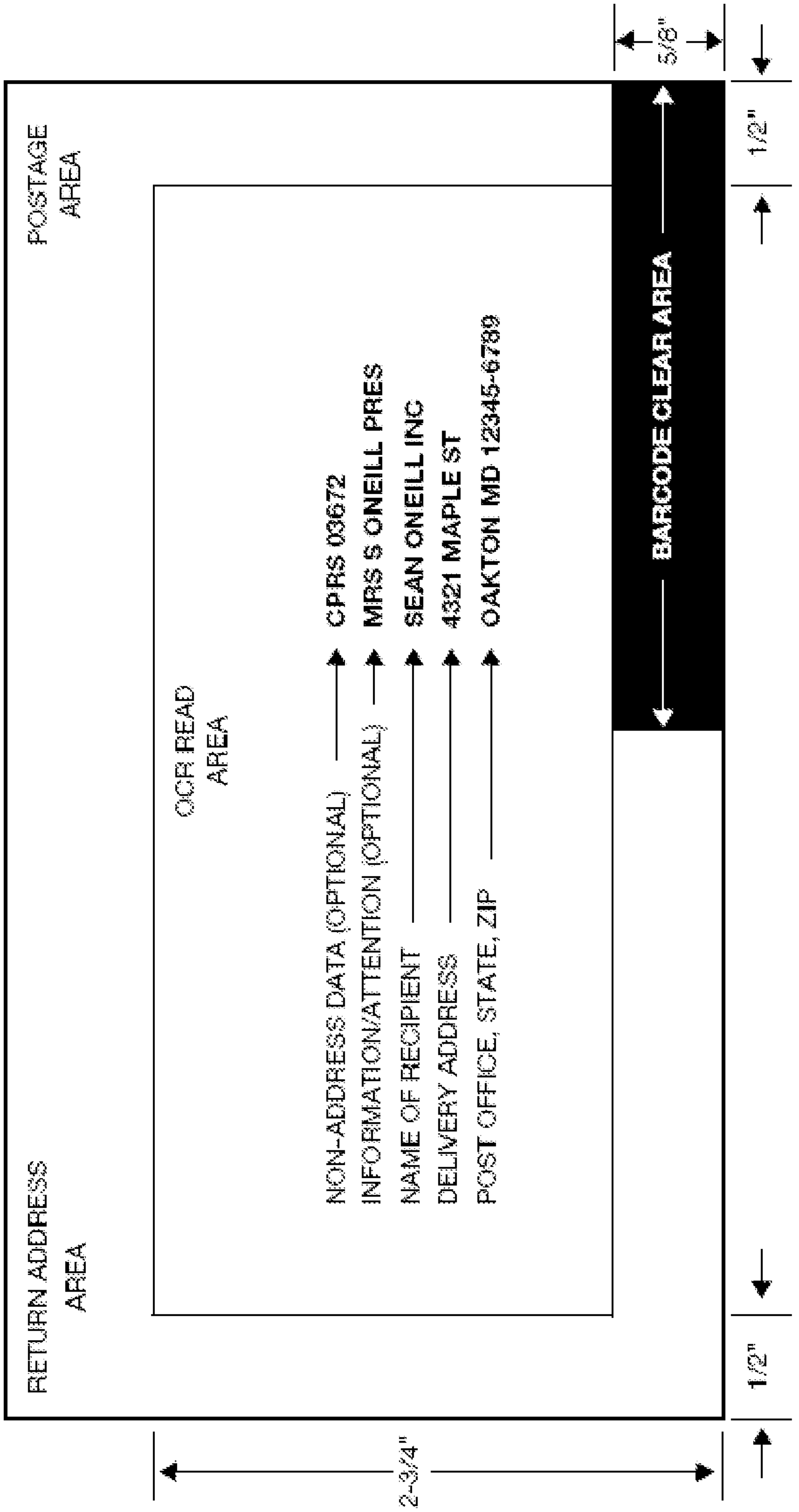
FIG. 8 is a diagram of a recommended address formatting on a mail piece.

Still, distinguishing the return address reliably presents a challenge. The USPS publishes a document called "Publication 28" (available at www.usps.gov) which provides postal addressing standards. In that publication, Appendix A—Address Formatting, section A1—Readability, sets forth a diagram reproduced herein as FIG. 8. According to the USPS, "the entire [destination] address should be contained in an imaginary rectangle known as the OCR read area . . . that extends from ⅝ inch to 2¾ inch from the bottom of the mailpiece, with ½ inch margins on each side." Note that there is no specifically defined region or size for the return address—it is generally located upward and to the left of the OCR read area, or on the back (this can be captured by a second camera). Especially on smaller mailpieces, one can imagine return address data spilling down into the OCR read area where the destination address should appear. As further explained below, various techniques and algorithms may be applied as necessary to locate and "recognize" the return address and the destination address (and determine which is which).

Referring again to FIG. 5, the image captured 502 includes both return address block 504 ("RAF 15400 NE 90$^{th}$ Street" etc) and destination address block 506 ("Jack Adams . . . "). In an embodiment, the destination address block 506 may correspond to the OCR read area of FIG. 8. However, different parameters may be used. For example, the image capture component may be specially configured for a particular run or batch of similar mailpieces where adjustment of the address region is advantageous. For example, a mailer may want to include a special message ("Anniversary Sale is On Now") or a company logo, located to the right of the destination address but still within the OCR read area (called extraneous or non-address printing). By adjusting the image capture to exclude that region (mechanically or in software), confusion in recognizing the address may be avoided or reduced.

In one aspect of the present disclosure, suitable software is arranged to implement one or more of the following techniques for determining which text block is which address. These techniques may include the address structure, point size, proximity to logos, location on the mail piece, and/or an input file that contains a list of candidate senders.

In one embodiment, any or all of the following techniques and characteristics can be used to distinguish a return address:

- Address structure. They will often have a structure that is distinct from the destination e.g., the street address and CSZ being on the same line separated by bullets.
- Point size. They will often have a point size that is smaller than the destination.
- Proximity to logos. If there are company logos on the mail piece the return address will be in proximity of it. It is also possible to read the logo.
- Location on mail piece. They are typically to the left or above the destination address.
- Address block name matches candidate mailer name. An input file listing the potential return addresses could be loaded into the system so that when a return address is read it would be matched to the list.

In an embodiment, any or all of the following techniques and characteristics can be used to distinguish a destination address:

- Address structure. They will often have 3 or more lines.
- Address structure. They can have a keyline as part of the address (used by mailers to convey information. Not used for mail routing).
- Address structure. They can have a barcode as part of the address either below or above.
- Location on mail piece. They are typically below or to the right of the return address In accordance with the present disclosure, both addresses preferably are read automatically in the time provided to process the mail piece so that all decisions concerning the mail can be made without having to rerun the mail piece. The process in a preferred embodiment proceeds as follows. The destination and return addresses are extracted by the recognition process. Both addresses are parsed, and converted into canonical form. This may be done one at a time, or concurrently, subject to the stated timing limitation. As indicated above, there may be advantages to processing destination and return addresses in parallel, so as to leverage relationships between them. The canonical addresses are returned, via path 512, to the transport module 500. In an embodiment, the destination routing code is returned as well. (A return address routing code may be provided as well for various purposes but it is not essential here.)

The transport component 500 then queries the move update (COA) database 420 with the canonical destination name/address to check for an address change. If there is a match, the COA database returns updated routing data (box 520) comprising a new destination address, as well as a corresponding routing code. The transport component 500 then causes a routing code to be sprayed, printed or otherwise affixed to the front of the mailpiece, for example in the POSTNET reserved region of FIG. 1, using the first routing code assigned by the recognition system if there is no match in the COA database 420, or using the updated routing code if one is provided by the COA database.

Figure 7:
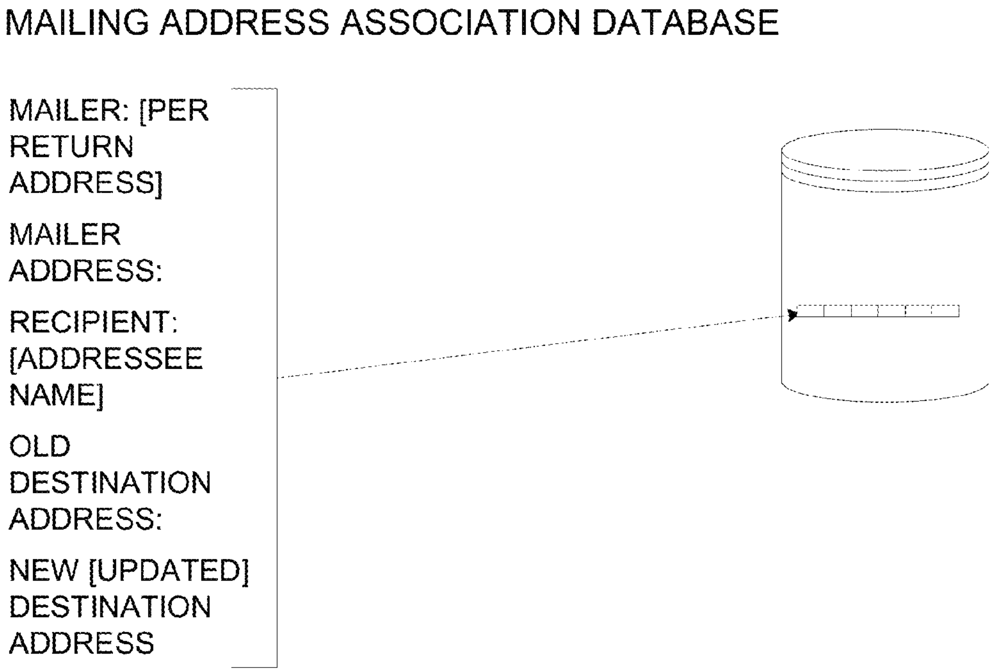
FIG. 7 is a conceptual diagram of one example of an association database data structure.

The transport component 500 also transmits the new information to an association database 550. In one embodiment, the association database is arranged to associate together the following data elements:

MAILER: [per return address]
MAILER ADDRESS: [return address]
RECIPIENT: [addressee name]
OLD DESTINATION ADDRESS [per captured image]:
NEW [UPDATED] DESTINATION ADDRESS By the verb "associate" we mean to store this data in a data storage system, using, for example, relationship tables, links, linked lists, or other techniques to indicate, explicitly or implicitly, that the various elements are related in that they all correspond to the same mail piece. In some embodiments, each mail piece may be assigned an identifier, but that is not essential. FIG. 7 is a conceptual diagram of one example of an association database data structure.

Features and Advantages of the Association Database

Figure 6:
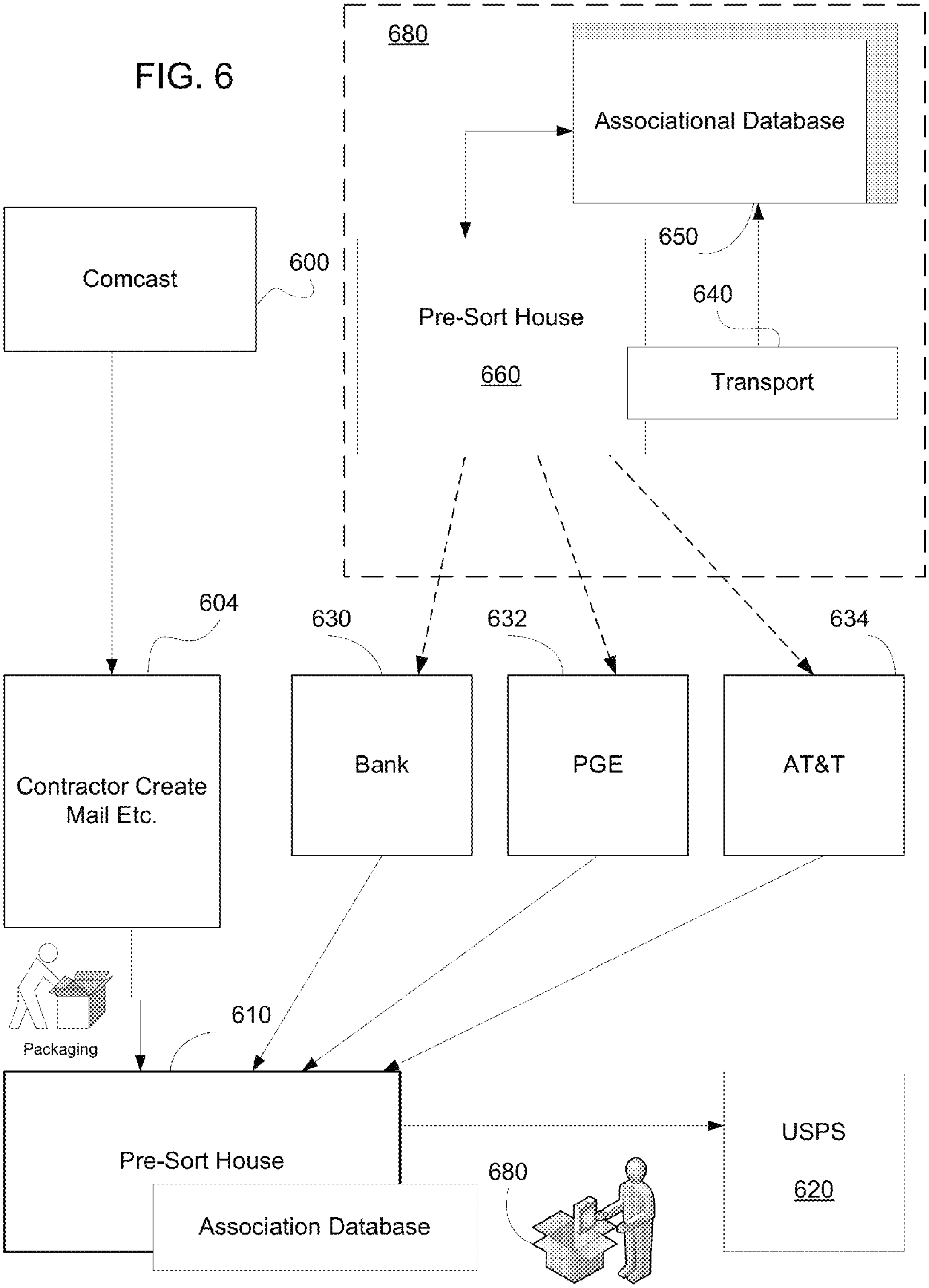
FIG. 6 is a simplified block diagram illustrating one embodiment of a system and method in accordance with the present disclosure to provide updated mailing list data to mailers.

Referring now to FIG. 6, a simplified flow diagram illustrates some of the uses and potential advantages of an association database for mail processing. Here, a corporate mailer 600, say Comcast, may create a bulk mailing itself, or it may use the services of a contractor 604 to create and stuff a batch of mail pieces for mailing. The contractor may then deliver the batch to a pre-sort house for processing. The pre-sort house 610 processes the mail using a system generally similar to that of FIG. 5 as described above. The completed batch of mail, with destination coding affixed (including updated coding on the pieces where a COA match was found), is delivered to the USPS 620 for delivery. The mail is already sorted according to those destination codes. For example, a batch is represented as a box 680 in the drawing, where each package in the box is a pre-sorted portion of the batch. As explained above, for any mail pieces in the batch where an address update occurred, that update information is stored in the association database.

In some cases, for example where one mailer's batch is too small to optimize discounted postage rates, the pre-sort house 610 may aggregate the mail pieces from multiple mailers together, called a co-mingled batch, so that the larger batch will qualify for better postage rates. To illustrate, FIG. 6 shows additional corporate mailers such as a bank 630, PGE 632 (a gas and electric utility), and AT&T 634 (a well-known telecommunications company). Each of these entities submits its respective batch of mail pieces to the pre-sort house 610 for processing, as indicated by the solid arrows in the drawing. This co-mingled batch is processed as describe above. Here, the return addresses will vary according to the identity of the sender.

Co-mingled mail also arises in another context. That is, some mail pieces may be difficult to "recognize" as describe above. In some systems, pieces that cannot be read within the allotted time are rejected and output to a secondary recognition system for another attempt to read them. This may occur at any mailer, pre-sort house, or within the USPS. The secondary or reject system may use different algorithms for recognition. The rejected pieces which are successfully read on a secondary system are then labeled or sprayed with the destination routing code, etc, and returned to mainstream processing. In some scenarios, the redeemed reject mail that is ready to resume mainstream processing may be aggregated until that mail becomes a batch large enough for discounted postage rates. So here again, a co-mingled batch is successfully recognized and the destination coded, including updating the destination address as appropriate. As above, the updates information preferably is stored in an association database. The association database need not be updated in real time, as long as the update information is buffered until the database is updated.

Referring once again to FIG. 6, a dashed box 680 surrounds a portion of the drawing that illustrates steps that occur subsequent to the other processing described above. Specifically, box 680 surrounds steps that use the association database 650. Consequently, these processes must either wait until the initial processing for a batch is completed, so the association data is complete, or in some other fashion coordinate with the association database to access complete data. The following activities, in other words, may be done "off line," after the processed mail has left the pre-sort or other mailing facility.

The pre-sort house 660, for example, has access to the association database 650. In one embodiment, the association database is maintained at the pre-sort facility. It may be implemented conveniently on the pre-sort transport system, or communicatively coupled to it. Although the transport component is used to update the database, as explained above, a completely separate process may be deployed to access and exploit that data.

In one embodiment, the pre-sort house (or other mailer) queries the association database to identify records or mail pieces that were mailed by that mailer, and for which the destination addresses were changed (updated). In some cases, where the return name/address is the mailer's name/address, it can easily and unambiguously identify those records. In other cases, where the entire batch came from a single originator (Comcast for example), it is easy to identify the originator (Comcast) but the originator's mailing list has incorrect customer addresses. With the association database, the new corrected address can be extracted and sent to the sender. This is indicated by the dashed lines in FIG. 6, going back to the bank and other senders. Preferably the data is sent with the associated customer (recipient) name, which then enables the corporate mailer to update its customer database or mailing list accordingly. These updates may be communicated electronically, for example using network file transfers, email attachments, removable storage media or hard copy.

Software Implementations

Above we referred to "software" in various contexts, for example, software is used to implement sorter machines and other handling equipment. A recognition system may be implemented in software, as is an address directory typically. We use the term software in its commonly understood sense to refer to computer programs or routines (subroutines, objects, plug-ins, etc. etc.). As is well known, computer programs generally comprise instructions that are stored in machine-readable or computer-readable storage media. Some embodiments of the present invention may include executable programs or instructions that are stored in machine-readable or computer-readable storage media, such as a digital memory. We do not imply that a "computer" in the conventional sense is required in any particular embodiment. For example, various processors, embedded or otherwise, may be used in equipment such as the machines described herein.

Memory for storing software again is well known. In some embodiments, memory associated with a given processor may be stored in the same physical device as the processor ("on-board" memory); for example, RAM or FLASH memory disposed within an integrated circuit microprocessor or the like. In other examples, the memory comprises an independent device, such as an external disk drive, storage array, or portable FLASH key fob. In such cases, the memory becomes "associated" with the digital processor when the two are operatively coupled together, or in communication with each other, for example by an I/O port, network connection, etc. such that the processor can read a file stored on the memory. Associated memory may be "read only" by design (ROM) or by virtue of permission settings, or not. Other examples include but are not limited to WORM, EPROM, EEPROM, FLASH, etc. Those technologies often are implemented in solid state semiconductor devices. Other memories may comprise moving parts, such a conventional rotating disk drive. All such memories are "machine readable" or "computer-readable" and may be used store executable instructions for implementing various embodiments of the present invention for mail piece sorting and related operations.

A "software product" refers to a memory device in which a series of executable instructions are stored in a machine-readable form so that a suitable machine or processor, with appropriate access to the software product, can execute the instructions to carry out a process implemented by the instructions. Any type of machine-readable memory, including without limitation those summarized above, may be used to make a software product. That said, it is also known that software can be distributed via electronic transmission, in which case there typically will be a corresponding software product at the transmitting end of the transmission, or the receiving end, or both. As just one example, a software implementation of an association database as described herein may be deployed within another process, or distributed as a standalone component, either on separate readable media or via electronic download.

Having described and illustrated a particular example system, it should be apparent that other systems may be modified in arrangement and detail without departing from the principles described above. We claim all modifications and variations coming within the spirit and scope of the following claims.

The invention claimed is:

1. A method for online processing of mail pieces, comprising the steps of:

receiving a mailpiece into an automated processing machine;

capturing an image of at least a front side of the mailpiece;

reading addressee name, a destination address and a sender address from the captured image of the mailpiece;

querying a move update (COA) database for a matching record based on the destination address and addressee name;

providing an association database for storage of digital database records;

if a matching record is found in the move update (COA) database, obtaining from the matching record an updated destination address;

determining a new routing code corresponding to the updated destination address;

determining whether an identity of a sender of the mailpiece is known; and if an identity of a sender of the mailpiece is unknown, and a matching record is found in the move update (COA) database based on the original destination address and addressee name, storing the addressee name, original destination address, updated destination address, and sender address data in association with one another in the association database.

2. The method of claim 1 and wherein:

the step of determining whether an identity of a sender of the mailpiece is known includes determining whether or not a valid IIVIB (Intelligent Mai1piece Barcode) that identifies the sender is visible on the mailpiece;

determining whether or not a code that authorizes ACS (Address Correction Service) is visible on the mailpiece; and if neither a valid IIVIB that identifies the sender nor an ACS authorization code is visible on the mailpiece, processing the mailpiece as one for which the identity of a sender of the mailpiece is unknown.

3. The method of claim 1 including communicating the information stored in the association database to a mailer associated with the sender address to support updating the sender's mailing list address data.

4. The method of claim 1 including:

identifying a sender of the mail piece based on the sender address read from the captured image.

5. The method of claim 1 and further comprising:

accessing the association database to retrieve records associated with a selected mailer; and exporting updated address information from the retrieved records to the selected mailer to support updating the sender's mailing list address data.

6. The method of claim 1 and further wherein the step of determining whether an identity of a sender of the mailpiece is known is conducted before receiving the mailpiece into the automated processing machine.

7. The method of claim 1 and further wherein the association database is maintained by an association database access software component communicatively coupled to a transport software component of the automated processing machine.

8. The method of claim 7 and further wherein the association database access software component resides on an automated mail sorter machine.

9. A mail processing system comprising:

a computer controller to control mail processing, the controller including a transport software component for processing mail pieces;

a mechanized track arranged for transporting mail pieces through the system under control of the transport software component;

an image capture device positioned along the track and coupled to the transport software component and arranged to capture an image of a mail piece engaged along the track;

a memory for storing a digital image file containing the captured image of the mail piece;

a recognition software component having access to an address directory and coupled to receive the stored digital image file, for parsing and recognizing name and address data;

wherein the image capture device and the recognition software are arranged to determine both a return address and a destination address of the mail piece;

and wherein the recognition software component also determines an addressee name;

an association database coupled to the transport software component, for storing address update information applicable to the mail piece; and further wherein the association database is configured to store the address update information in association with the return address of the mail piece.

10. The mail processing system of claim 9 wherein the recognition software component is arranged to implement one or more of the following criteria for determining a return address in the stored image of the mail piece:

address structure different from the destination address structure;

point size smaller than the destination address point size;

proximity to a graphic logo;

location on the mail piece; and reference to an input file that contains a list of candidate senders' return addresses.

11. The mail processing system of claim 9 wherein the recognition software component is arranged to implement one or more of the following criteria for determining a destination address in the stored image of the mail piece:

address structure including three or more lines;

address structure including a keyline as part of the address;

address structure including a barcode; and a location on mail piece below or to the right of the return address.

12. A mail processing system comprising:

a computer controller to control mail processing, the controller including a transport software component for processing mail pieces;

a mechanized track arranged for transporting mail pieces through the system under control of the transport software component;

an image capture device positioned along the track and coupled to the transport software component and arranged to capture an image of a mail piece engaged along the track;

a memory for storing a digital image file containing the captured image of the mail piece;

a recognition software component having access to an address directory and coupled to receive the stored digital image file, for parsing and recognizing name and address data;

wherein the image capture device and the recognition software are arranged to determine both a return address and a destination address of the mail piece;

and wherein the recognition software component also determines an addressee name;

an association database coupled to the transport software component, for storing address update information applicable to the mail piece; and further wherein the association database is configured to store the address update information in association with the return address of the mail piece; wherein the recognition software component is configured for reading both a destination address and a sender address from the captured image of the mailpiece within a predetermined time selected to avoid re-running the mailpiece through the automated sorting operation; and the system further includes an inline printer or sprayer arranged to automatically affix the routing code to the mail piece before the mail piece exits the automated processing machine in the case that no match is found for the mail piece in a move update (COA) database; and automatically affix the new routing code to the mail piece before the mail piece exits the automated processing machine in the case that a match is found for the mail piece in the move update (COA) database.

13. The mail processing system of claim 9 wherein the system is coupled to a change of address database to acquire the address update information automatically.

14. The mail processing system of claim 9 wherein the recognition software component is configured for reading both the destination address and the sender address from the captured image of the mailpiece substantially concurrently.

15. A method for online processing of mail pieces, comprising the steps of:

receiving a mailpiece into an automated processing machine;

recognizing at least an addressee name, and a destination address, from an OCR read area on the front side of the mailpiece;

recognizing at least a sender address from a return address area of the front or back side of the mailpiece;

querying a move update (COA) database for a matching record based on the destination address and addressee name;

if a matching record is found in the move update (COA) database based on the destination address and addressee name, obtaining an updated destination address from the matching database record;

if neither a valid IMB nor an ACS authorization code is visible on the mailpiece, and a matching record is found in the move update (COA) database based on the destination address and addressee name, storing the addressee name, original destination address, updated destination address, and sender address data in association with one another in the association database;

identifying a sender of the mailpiece based on the sender address recognized in the return address area of the mailpiece; and providing access to data stored in the association database for the identified sender to use in updating the sender's mailing list.

* * * * *